(12) United States Patent
Worobey

(10) Patent No.: US 8,882,145 B1
(45) Date of Patent: Nov. 11, 2014

(54) STEERING SYSTEM FOR MOTORIZED PERSONAL TRANSPORT VEHICLE

(71) Applicant: Robert N. Worobey, Westerly, RI (US)

(72) Inventor: Robert N. Worobey, Westerly, RI (US)

( * ) Notice: Subject to any disclaimer, the term of this patent is extended or adjusted under 35 U.S.C. 154(b) by 0 days.

(21) Appl. No.: 13/889,072

(22) Filed: May 7, 2013

(51) Int. Cl.
*B62D 1/00* (2006.01)
*B62D 1/22* (2006.01)

(52) U.S. Cl.
CPC ........................................ *B62D 1/22* (2013.01)
USPC .............................. 280/771; 280/87.1; 74/512

(58) Field of Classification Search
CPC ............ B62D 51/02; B62K 5/05; B62K 5/08; B62K 5/10
USPC ............... 280/62, 87.41, 771, 87.1; 180/87.1, 180/210, 211; 74/512
See application file for complete search history.

(56) References Cited

U.S. PATENT DOCUMENTS

| | | | | |
|---|---|---|---|---|
| 4,088,199 | A | * | 5/1978 | Trautwein ..................... 180/209 |
| 5,431,243 | A | * | 7/1995 | Richards ....................... 180/211 |
| 2013/0214503 | A1 | * | 8/2013 | Chiuppani ............. 280/124.103 |

* cited by examiner

*Primary Examiner* — Paul N Dickson
*Assistant Examiner* — Robert A Coker
(74) *Attorney, Agent, or Firm* — Daniel S. Coolidge

(57) ABSTRACT

An apparatus and method for steering a three wheeled personal transportation vehicle is described. Steering is accomplished by one or more footpads attached to a fore and aft rotatable torsion bar, which in turn is attached at the front end to a Pitman arm and conventional steering mechanism. An adjustable steering centering assembly is also described.

8 Claims, 6 Drawing Sheets

STEERING SYSTEM FOR MOTORIZED PERSONAL TRANSPORT VEHICLE

This application claims priority from provisional application No. 61/646,386, filed May 14, 2012.

FIELD OF THE INVENTION

The present invention relates to motor vehicles, and more particularly to a method and system for steering a motorized personal transport vehicle.

BACKGROUND INFORMATION

The cost of owning an automobile is constantly increasing. Not only is the cost of fuel increasing, but the cost of storage, maintenance and insurance all suggest that there should be an alternative.

Motorized personal transport vehicles are not new. For example, the two wheeled Segway exists, but is expensive, heavy and difficult to use for transport of items such as groceries and the like. There are motorized skateboards and scooters, but they are two wheeled, prone to tipping, and again suffer from lack of ability to transport groceries and like items. They often are difficult to transport in other forms of transportation, such as in an automobile.

What is needed is a relatively inexpensive motorized personal transport vehicle designed for around town use, boardwalks, bike paths, beaches and roads. It should combine form and function into an attractive yet powerful transportation design that is capable of transporting small loads, transported in a car, and stored indoors.

BRIEF SUMMARY

The present invention is embodied and an assembly and method for steering a personal transport vehicle. The method includes in yet another embodiment a method for applying returning force to center the steering.

In one embodiment, the present invention comprises a novel steering column assembly for personal transport vehicle, comprising a torsion shaft connected to the Pitman arm of a conventional two wheel steering mechanism. The torsion shaft runs horizontally above a central fore aft frame member, and is supported by bearings held by amounts connected to the central frame member. One or more footpads are attached to the torsion shaft. A user stands on the footpads and applies pressure on either side of the torsion shaft to rotate the torsion shaft, and thereby the Pitman arm causing steering of the vehicle. In yet another embodiment, there are two footpads.

In yet another embodiment, a centering mechanism is provided to provide increasing pressure when the torsion bar is turned to return the torsion bar to a center, straight ahead position. This is accomplished by springs on either side of the paddle extending from the torsion bar which springs are mounted on a U-bolt held by tabs extending from the central frame member.

BRIEF DESCRIPTION OF THE DRAWINGS

These and other features and advantages of the present invention will be better understood by reading the following detailed description, taken together with the drawings wherein.

Like reference numbers and designations in the various drawings indicate like elements. Other features and advantages of the invention will become apparent from the description, the drawings, and the claims.

DETAILED DESCRIPTION

The Tribey is a three wheeled light electric vehicle designed for around town use, boardwalks, bike paths, beaches and on the roads. It has a novel steering assembly that makes it fun and intuitive to use. They can be transported in a car, stored indoors, easily repaired and modified to be able to pull a small trailer.

The Tribey utilizes a unique steering column assembly for standup operation. In one embodiment, the user steers by leaning from one side to the other in the direction that he or she desires to turn. Footpads mounted on a central fore and aft torsion shaft allow the driver to stand and steer the Tribey.

In one embodiment, an electric hub motor is used for motive power in the forward and reverse direction. Alternative forms of propulsion may be used beneficially to achieve the same result, such as gasoline motors and a clutch, but are more complex and require added weight and messy fuels. Alternatively, a gasoline motor driving a generator could be used, but again adds weight, mechanical complexity and requires messy fuel. In a preferred embodiment, electric storage batteries are used and an electric motor. The hub motor was found to be the lightest and most effective choice.

By utilizing the electric hub motor, a clutch is not required. In one embodiment, a handheld unit (not shown) connected by cables to the braking system and a hub motor controller box is utilized to control the Tribey. Forward or reverse can be controlled by a thumb operated switch, speed with a trigger and braking with a cable or hydraulic hose connected to the braking mechanisms. Electric brakes can also be used. In a preferred embodiment, a hydraulic caliper brake system controlled by a handheld unit with a squeeze lever was found to be the best choice. The squeeze lever is similar to a motorcycle braking control. Alternatively, the controls could be mounted on a pedestal, but that involves additional weight and complexity.

Utilizing a hub motor allows it to be easily replaced if damaged or upgraded much in the same manner as a rear motorcycle wheel. In yet another embodiment, an onboard electrical controller controls all the functions of the hub motor, and its operating parameters can be modified by attaching a control communication cable, such as, for example an RS-232 cable, and connecting to a computer and running a program to modify operational parameters. Typically these programs are supplied by the controller supplier.

Figure 1:
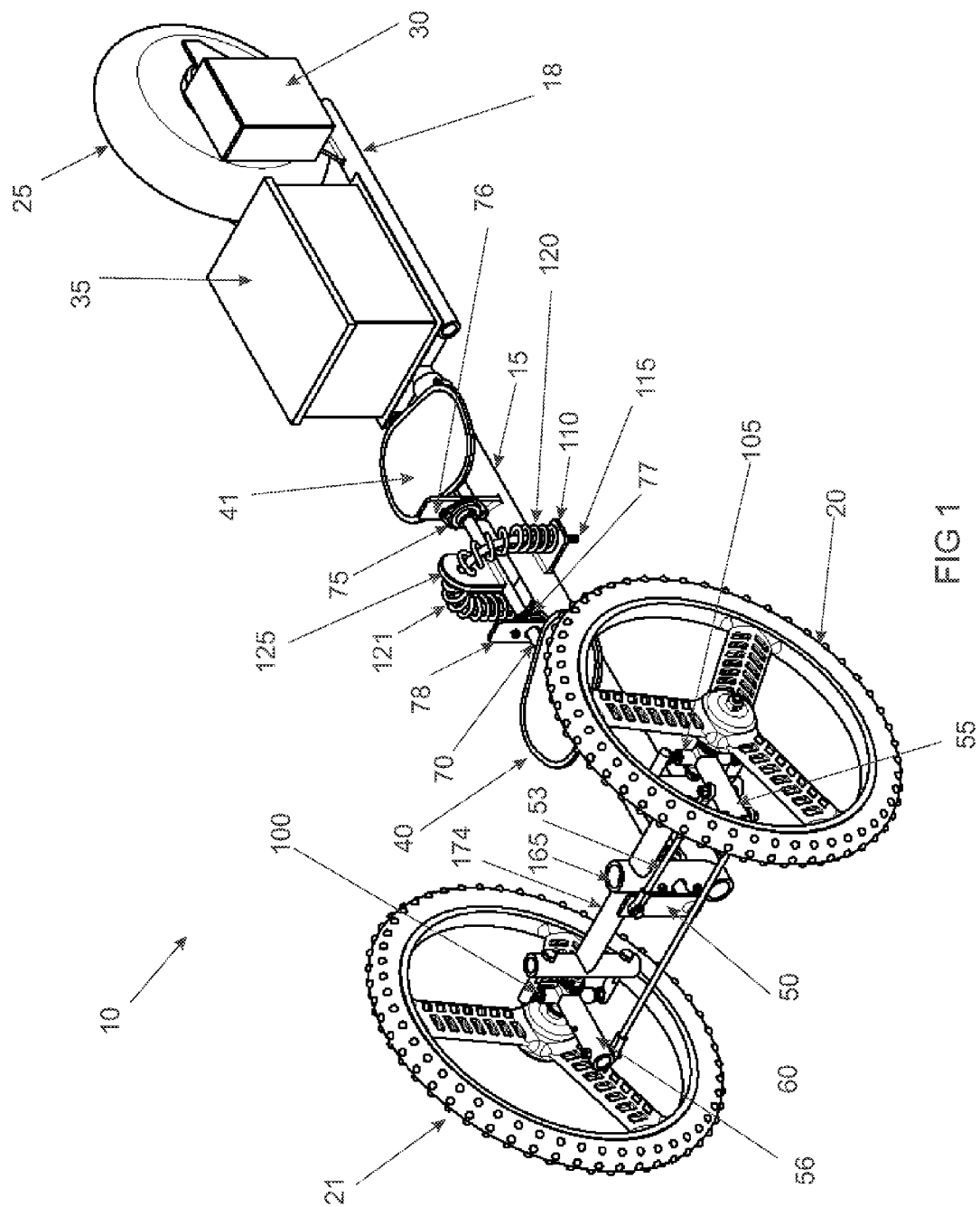
FIG. 1 is an oblique downward view of the Tribey personal transport vehicle with steering column assembly.
Figure 2:
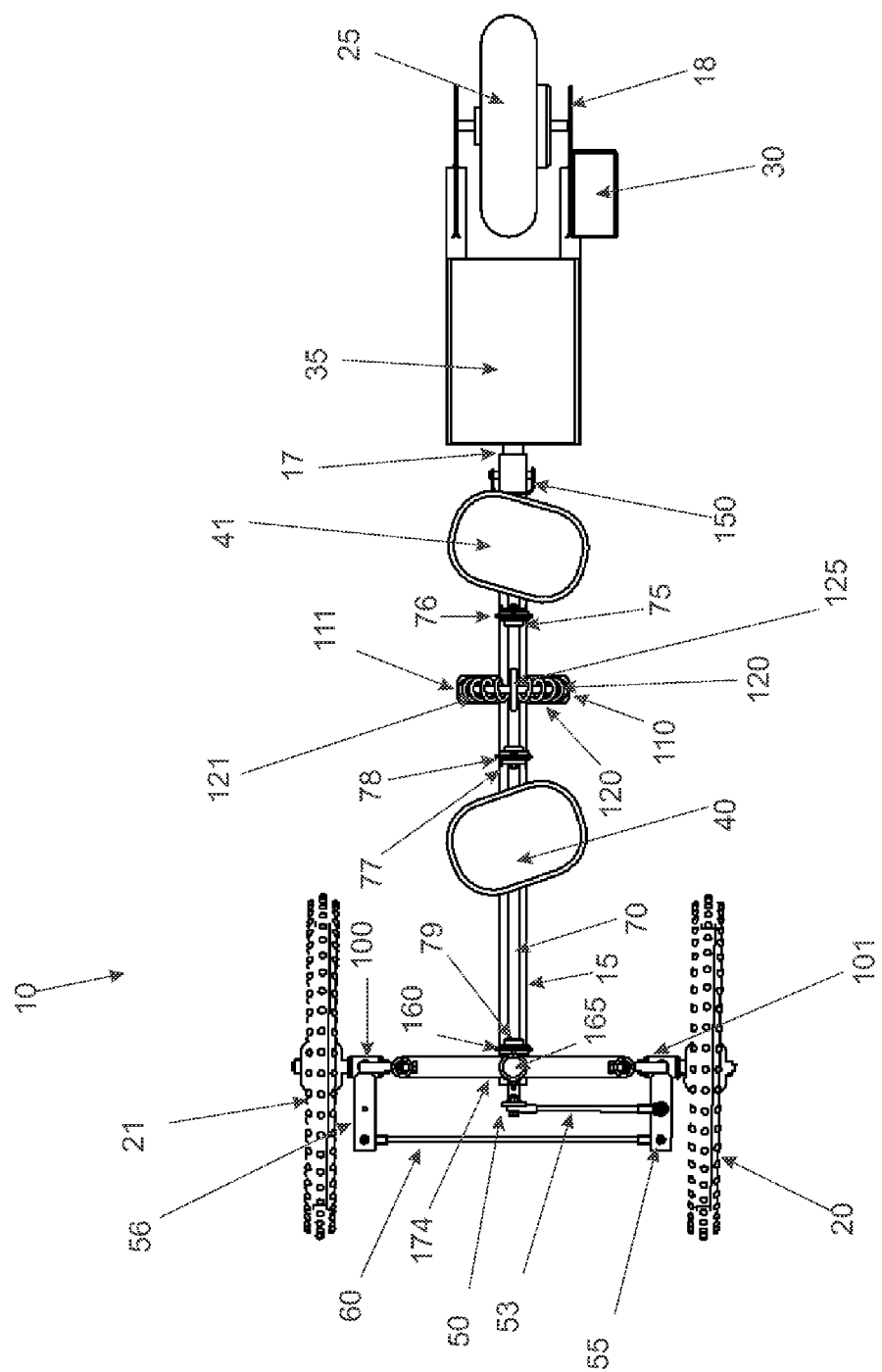
FIG. 2 is a top-down orthogonal view of a Tribey personal transport vehicle with steering column

Referring to FIG. 1, an overall top oblique view of one embodiment of the Tribey is shown, and FIG. 2 shows a top-down orthogonal view of the Tribey. In this embodiment, the Tribey comprises a tubular fore and aft frame 15. Other frame cross section could be utilized, such as I-beam or square, but tubular was found to be the easiest for manufacture. At the front end is the conventional two-wheel steering mechanism described in greater detail below. The front of the frame 15 comprises a vertical member 165 fixedly attached to the frame 15 and a cross member 174 to support the wheels 20 and 21.

As will be described below, in one embodiment the novel steering column assembly includes two footpads 40 and 41 mounted on a rotatable torsion shaft 70 running parallel to the fore-aft axis of the Tribey above the frame 15. Only one footpad could be utilized, but it was found that two footpads was more comfortable and provided greater stability for the user. The torsion shaft 70 is supported by bearings 75, 77 and 79 held by bearing supports 76,78 and 160 affixed to and extending upward from the frame 15. Fixedly attached to the front end of the torsion shaft 70 is a Pitman arm 50 extending vertically from the torsion shaft 70. The Pitman arm 50 in turn is attached to a conventional steering mechanism described below.

Figure 3:
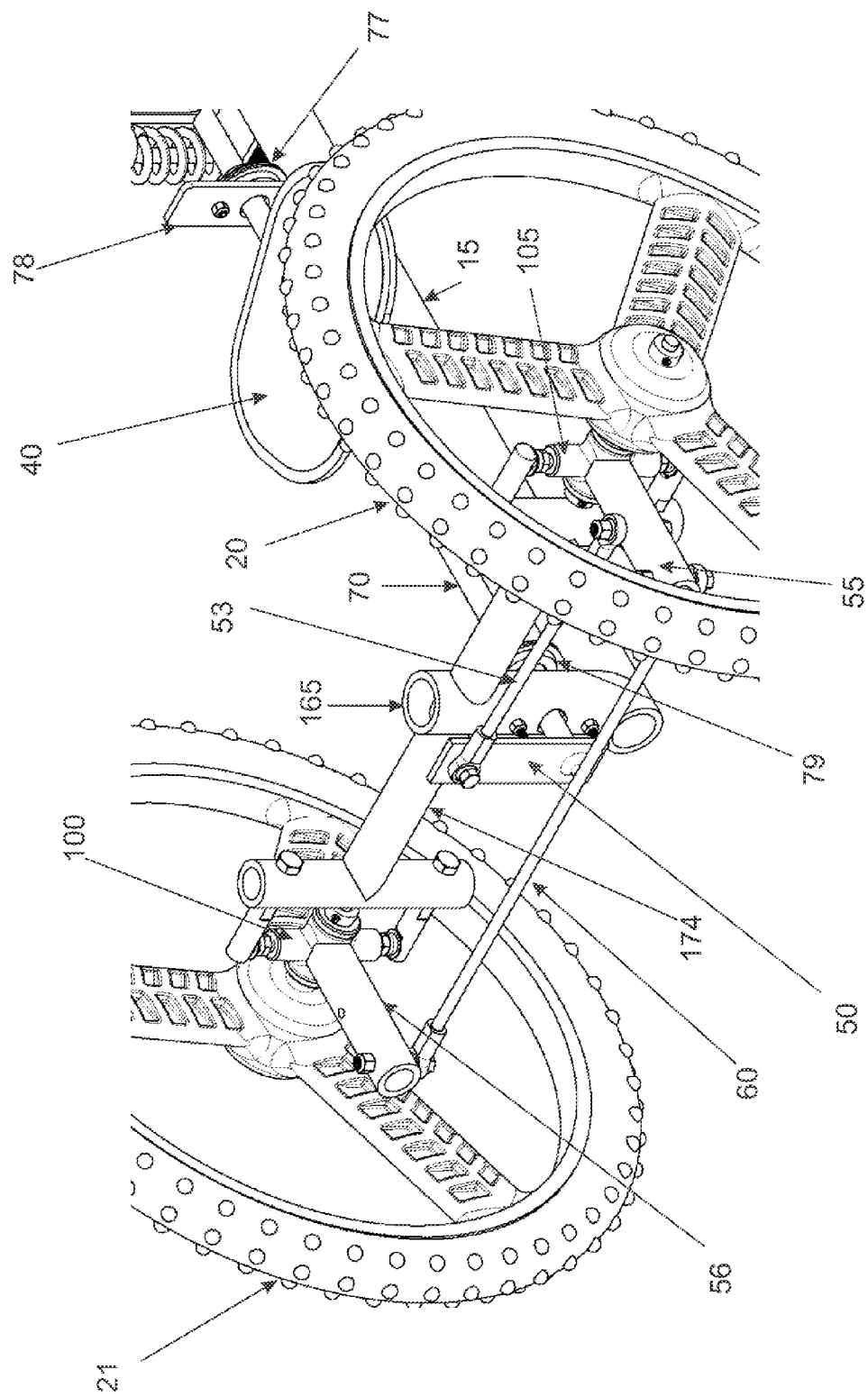
FIG. 3 is a close-up oblique detail view of a portion of the conventional steering mechanism of a Tribey personal transport vehicle.

Rotation of the torsion shaft 70 either clockwise or counterclockwise causes the Pitman arm 50 to move correspondingly left or right. The conventional steering mechanism may be seen in greater detail in FIG. 3. A steering rod 53 is attached at one end to the Pitman arm 50 and at the other end to either the left 55 or right 56 wheel mount arm. Movement of either wheel mount arm 55 or 56 causes the respective wheel 20 or 21 to move perpendicularly to the plane of rotation of the wheel, providing steering. The wheels steer in tandem by means of a connecting rod 60 attached between both wheel mount arms 55 and 56 such that the steering force applied to one wheel 20 is transmitted through the connecting rod to the other wheel 21. Steering knuckles 100 and 105, as shown in FIG. 2, allow steering motion of each wheel 20 and 21.

In the conventional steering mechanism described above, it is important that the length of the Pitman arm be chosen so as to provide an appropriate degree of turning for a given amount of rotation of the steering column. Too short, and the steering will be too insensitive. Too long, and the steering will be too sensitive.

The torsion shaft is supported in multiple locations by bearings 75, 77 and 79 mounted bearing supports 76, 78 and 160, each attached to the central frame 15. In one embodiment as shown in FIGS. 1 and 2, bearing 75, 77 and 79 are held and supported by bearing supports 76, 78 and 160. The bearing supports 76, 78 and 160 are held rigidly in place attached to and extending upwards from the frame 15. Other arrangements and numbers of bearings and bearing supports could be beneficially used. The choice of bearing supports 78 and 76 next to footpads 40 and 41 helps to support the weight of the driver.

Referring to FIG. 2, a rear frame 18 connects to the frame 15 as shown in FIG. 2. The rear frame 18 has a tubular projection 17 which fits into the frame 15. The tubular projection can be made either from smaller tubing size so as to be able to fit into frame 15, or may be of the same size as frame 15 but swaged to be able to fit into the interior of frame 15. Matching holes (not shown) are drilled into the intersection of frame 15 and tubular projection 17 so as to hold frame 15 and tubular projection 17 in place with a linchpin 150 inserted into the holes. By removing the linchpin 150, the front and rear portions of the Tribey may be separated into a drive component and a separate steering component for transportation and storage.

The rear frame 18 supports a battery box 35 which provides motive power. A hub motor and wheel 25 obtains electrical power from the battery (not shown). In one embodiment, the Tribey uses four 12 volt lead acid 14 amp hour batteries that are wired in series to produce 48 volts. The battery pack consisting of the four batteries may be added to in order to achieve greater range. Other types and configurations of batteries may also be used as batteries become more power dense and inexpensive.

A basket, not shown, may be mounted on top the battery box 35 to provide for transportation of goods.

The hub motor 25 utilizes a programmable controller 30 that may be configured by attaching a control communication cable, such as an RS-232 cable, and connecting to a computer and running a program to modify operational parameters. Typically, such a program is provided by the hub motor manufacturer.

Figure 4:
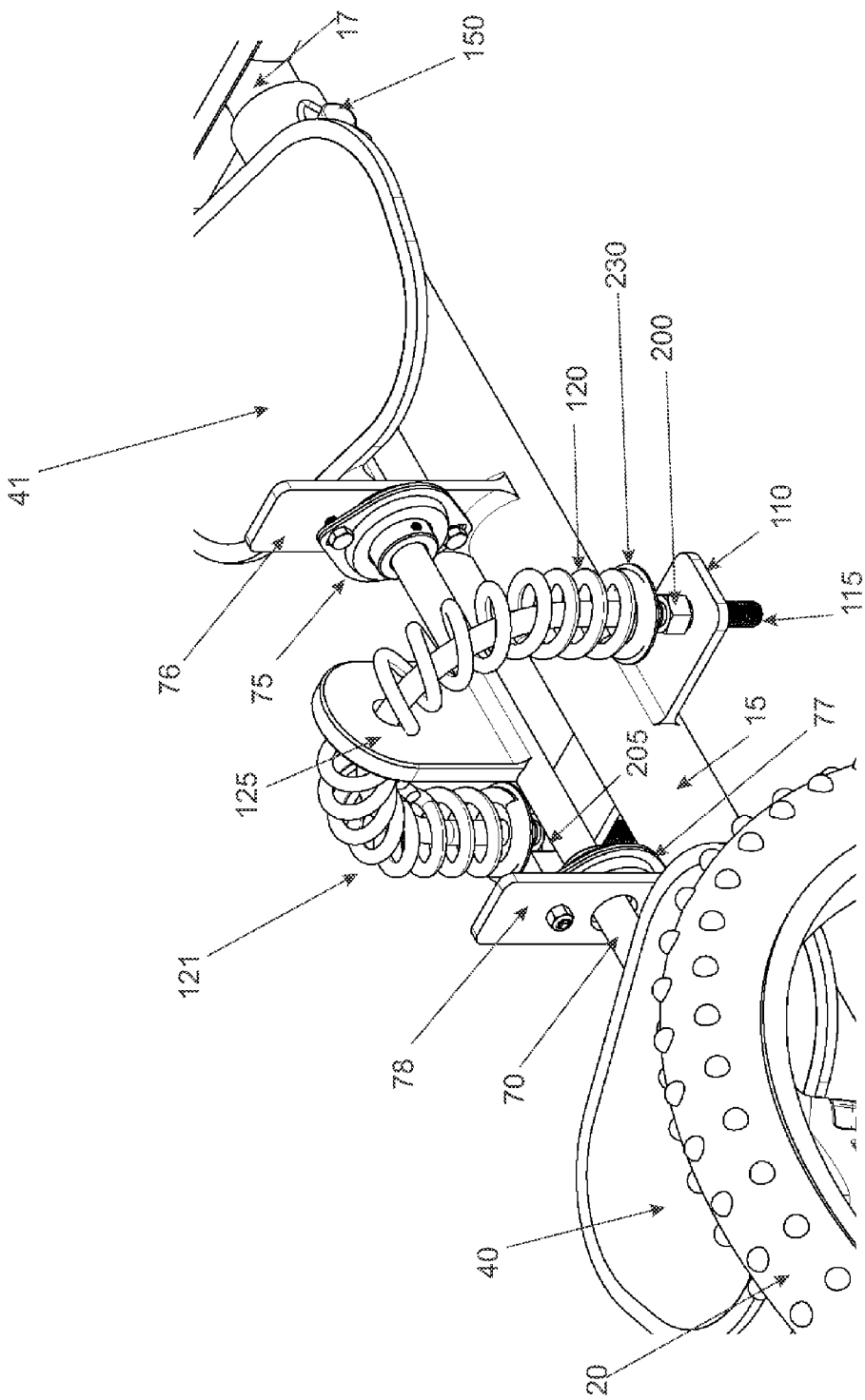
FIG. 4 is an oblique detail view of the steering centering mechanism of a Tribey steering column assembly.
Figure 5:
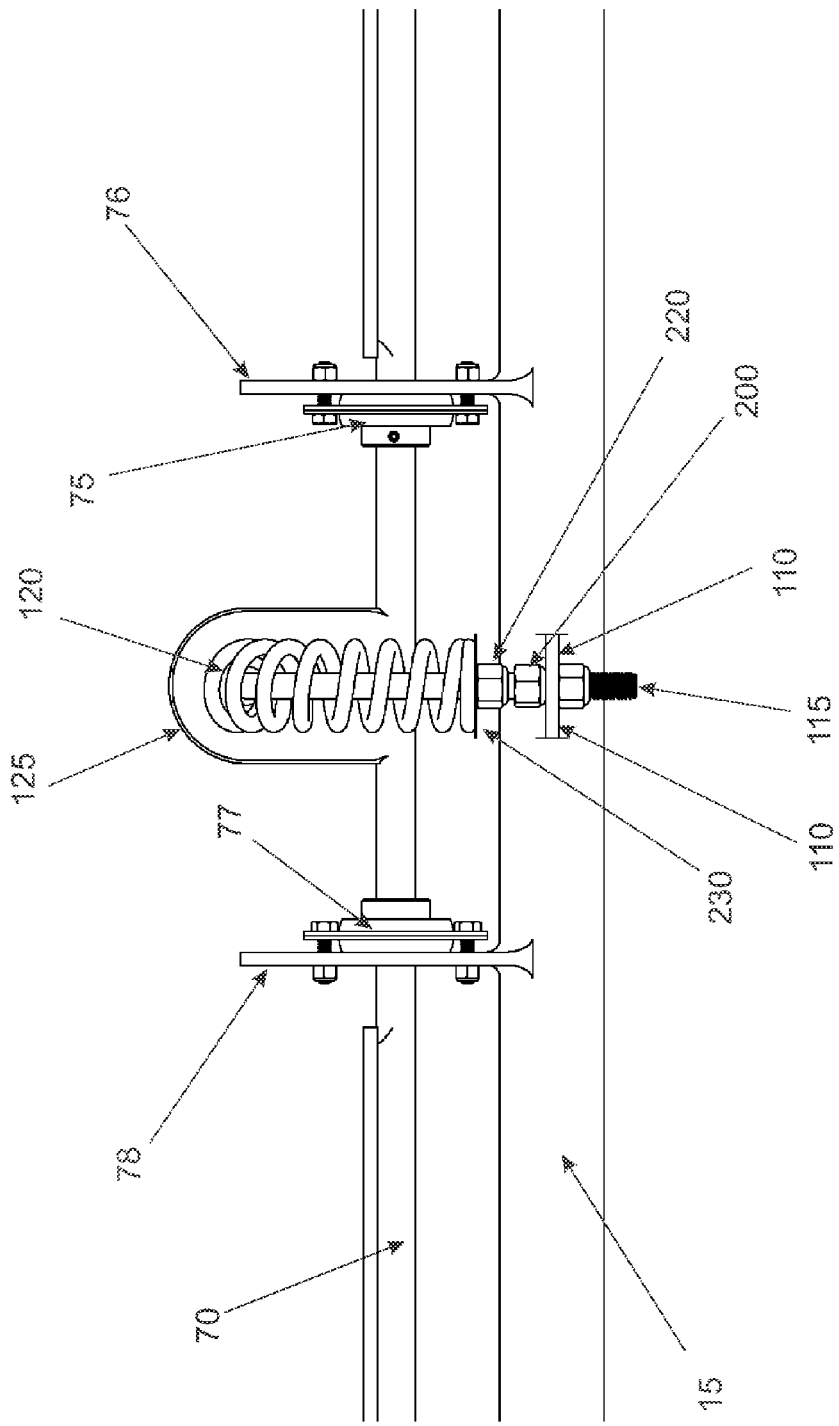
FIG. 5 top-down close-up orthogonal view of a steering centering mechanism of a Tribey personal transport vehicle.

The steering column assembly tends to center itself by a centering assembly shown in FIGS. 4 and 5. (Certain features of the centering assembly are only viewable in on or the other of FIGS. 4 and 5.) A left stationary tab 110 and right stationary tab 111 (visible in FIG. 6) are fixedly attached and extend horizontally outward from the frame 15. Each of the stationary tab 110 and 111 have a whole within which a U-bolt 115 may pass. The U-bolt 115 is held in position on the underside of stationary tab 110 and 111 by nuts 230 on the left side, and an unseen nut on the right side. The U-bolt 115 is secured firmly in place by nuts 200 and 205 tightened against and on top of stationary tab 110 and 111 respectively.

On the left side, spring 120 is inserted around U-bolt 115 between the paddle 125, washer 230 and left adjusting nut 200. Similarly on the right side, spring 121 is inserted around U-bolt 115 between paddle 125, washer 231, and right adjusting nut (not visible or shown). Adjustment of the center position of the steering column can be adjusted by turning the left adjusting nut 200 and the right adjusting nut (not shown).

The top curved portion of the U-bolt 115 passes through a hole in a paddle 125. Paddle 125 is fixedly attached to the torsion shaft 70, extending in the center steering position upwardly from torsion bar 70.

Figure 6:
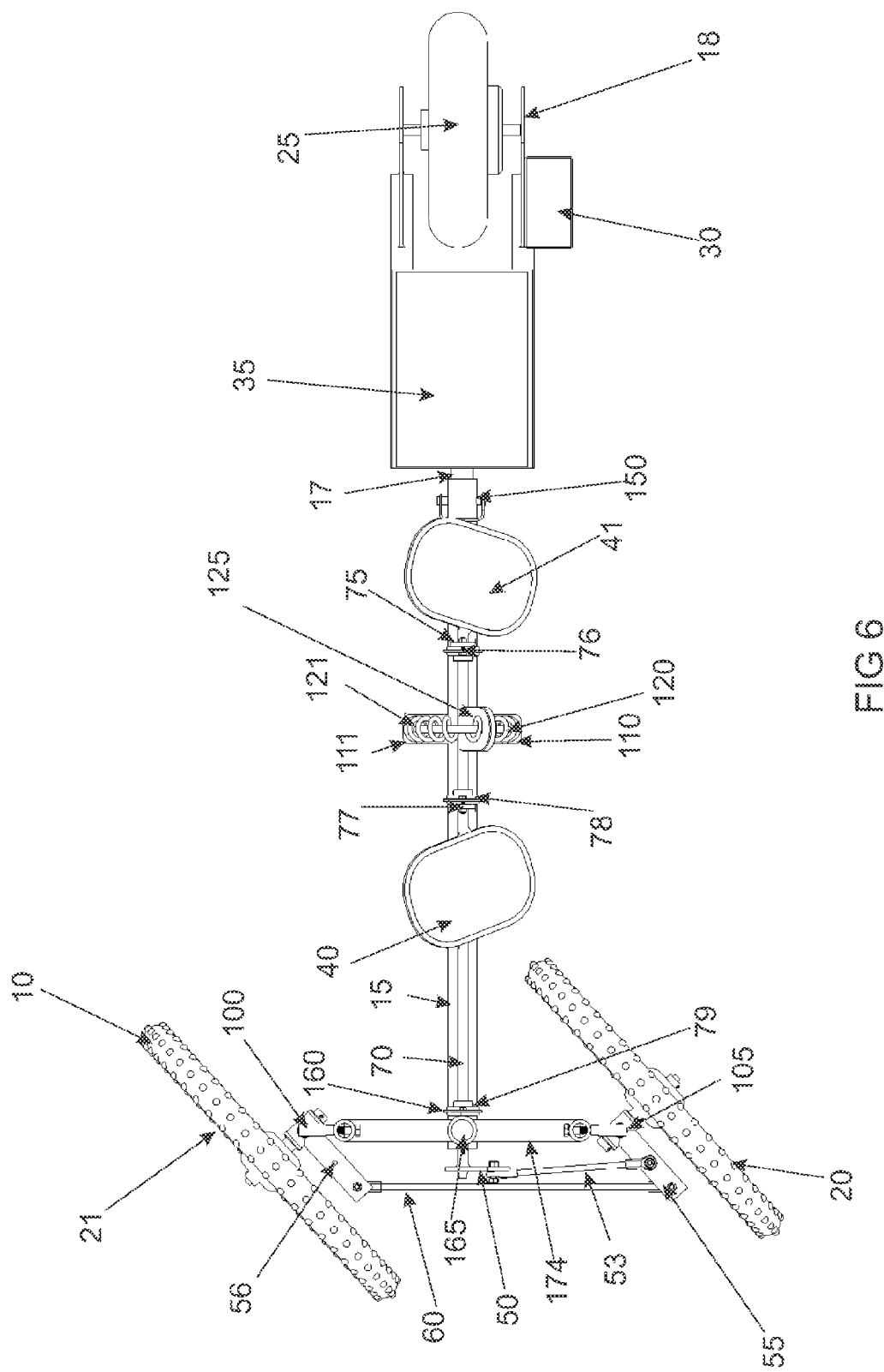
FIG. 6 is a top-down orthogonal view of a Tribey personal transport vehicle in a tight left turn.

Referring to FIG. 6, the Tribey is shown in a left turn configuration. Spring 120 is shown to be compressed, while spring 121 is uncompressed, applying force to paddle 125 toward the center steering position. Footpads 40 and 41 appear foreshortened because of the rotation of torsion bar 70 to implement the left turn. Wheels 20 and 21 are shown in the left turn position.

In a preferred embodiment, the frame of the Tribey is constructed of 6061 aluminum. Other metals may be beneficially used, however. The choice of this material was good endurance of outdoor conditions such as rain, snow, seawater as well as abrasions. The aluminum frame handles vibrations better than steel, and also has the added benefit of not needing to be painted protected from rust. In one embodiment, all rod ends, ball joints, nuts, washers and bolts are made from stainless steel to resist corrosion.

In one embodiment of the Tribey, two front BMX 20 inch wheels are utilized, designed to take abuse. Other wheel choices could be beneficially used, depending on cost and application.

A trailer may be adapted to be towed by the Tribey. Different configurations of storage mounted on the Tribey may be utilized, as well as shrouds for portions of the Tribey. Each addition, however, adds weight.

The invention has been described in terms of particular embodiments. Other embodiments are within the scope of the following claims. For example, the steps of the invention can be performed in a different order and still achieve desirable results. Modifications and substitutions by one of ordinary skill in the art are considered to be within the scope of the present invention, which is not to be limited except by the following claims.

The invention claimed is:

1. A steering column assembly for a personal transport vehicle having a conventional two wheel steering mechanism and a central horizontal fore-aft frame member, said steering assembly comprising:
   a torsion shaft, a plurality of bearings, a plurality of bearing mounts and at least one foot pad;
   said bearing mounts being fixedly attached to and extending upwardly from said central horizontal fore-aft frame member in a generally fore-aft line, with each of said plurality of bearing mounts being adapted to receive and fixedly hold one of said plurality of bearings in position so as to rotatably receive and support said torsion shaft;
   said torsion shaft having a top side and a fore end;
   said at least one foot pad being fixedly attached to said top side of said torsion shaft;
   said fore end of said torsion shaft being connectable to a Pitman arm of a conventional steering assembly on said personal transport vehicle, operable to steer said vehicle by applying pressure to said at least one footpad.

2. The steering column assembly of claim 1 comprising two foot pads.

3. The steering column assembly off claim 1 further comprising a centering assembly, said centering assembly comprising:
   further comprising a U-bolt having a left and a right threaded portion and a round top portion;
   a first and second spring, a right and a left adjusting nut, and a left and right washer;
   a paddle fixedly mounted on and extending outwardly from said of said top side of said torsion shaft and extending outwardly from, said paddle having a hole at a right angles to said torsion shaft adapted to receive said U-bolt;
   further comprising a first and a second stationary tab each fixedly mounted on said central frame member and extending outwardly therefrom and in a position beneath and at generally right angles to said paddle, each having a hole therein adapted to receive said threaded ends of said U-bolt;
   said hole in said paddle and said holes in said stationary tab positioned and sized so as to receive said U-bolt with said paddle being between said stationary tabs; and further said U-bolt left and right threaded ends being fixedly mounted to said left and right stationary tabs respectively;
   said U-bolt passing through, in order: said left adjusting nut, said left adjusting nut being threaded onto said left threaded portion of said U-bolt above said left stationary tab; said left washer; said first spring; said paddle; said second spring; said second washer; and said right adjusting nut, said right adjusting nut being threaded upon said right threaded portion of said U-bolt and above said right stationary tab;
   operable to cause pressure upon said paddle to bring it to a centered position wherein said steering mechanism is centered.

4. The steering column assembly of claim 3 comprising two footpads, mounted on either side of said centering mechanism.

5. A method of steering a personal motorized transport vehicle, comprising the steps of:
   providing an at least three wheel personal transport vehicle having a conventional two wheel front steering mechanism having a Pitman arm;
   said vehicle further having a central fore-aft frame member having a fore end and an aft end;
   providing a torsion bar, having a fore end at least two bearings and at least two bearing supports;
   fixedly attaching said at least two bearing supports on said central fore-aft frame member in a line generally parallel to said central fore-aft frame member; further mounting said at least two bearings on said at least two bearing supports and further positioning said torsion bar through said at least two bearings;
   fixedly mounting at least one footpad atop said torsion bar in a position generally furthest from said central fore-aft frame member;
   connecting said fore end of said torsion bar to said Pitman arm;
   steering said vehicle by applying pressure to said at least one footpad so as to apply torsion to said torsion bar.

6. The method of claim 5 further providing two foot pads.

7. The method of claim 6 further providing means for centering said steering mechanism, wherein said centering means is mounted between said two footpads.

8. The method of claim 5 further providing means for centering said steering mechanism.

* * * * *